US008526745B2

(12) United States Patent
Liu et al.

(10) Patent No.: US 8,526,745 B2
(45) Date of Patent: Sep. 3, 2013

(54) EMBEDDED GRAPHICS CODING: REORDERED BITSTREAM FOR PARALLEL DECODING

(75) Inventors: Wei Liu, San Jose, CA (US); Mohammad Gharavi-Alkhansari, Santa Clara, CA (US)

(73) Assignee: Sony Corporation, Tokyo (JP)

( * ) Notice: Subject to any disclaimer, the term of this patent is extended or adjusted under 35 U.S.C. 154(b) by 405 days.

(21) Appl. No.: 12/950,843

(22) Filed: Nov. 19, 2010

(65) Prior Publication Data

US 2011/0135210 A1   Jun. 9, 2011

Related U.S. Application Data

(60) Provisional application No. 61/266,400, filed on Dec. 3, 2009.

(51) Int. Cl.
*H04N 7/50* (2006.01)
(52) U.S. Cl.
USPC .......................... 382/232; 382/233; 382/240
(58) Field of Classification Search
USPC ................ 382/232, 233, 162, 166, 240, 248, 382/239, 251; 348/222.1; 375/E7.037, E7.045, 375/E7.048, E7.028
See application file for complete search history.

(56) References Cited

U.S. PATENT DOCUMENTS

| 5,471,206 | A | 11/1995 | Allen et al. | |
| 6,983,075 | B2* | 1/2006 | Schwartz et al. | 382/251 |
| 7,095,900 | B2* | 8/2006 | Schwartz et al. | 382/251 |
| 7,164,804 | B2* | 1/2007 | Boliek et al. | 382/248 |
| 7,477,792 | B2* | 1/2009 | Wu et al. | 382/240 |
| 2007/0189397 | A1 | 8/2007 | Ngo et al. | |
| 2007/0202843 | A1 | 8/2007 | Niu et al. | |
| 2009/0158130 | A1 | 6/2009 | Cheun et al. | |
| 2009/0265744 | A1 | 10/2009 | Singh et al. | |

FOREIGN PATENT DOCUMENTS

| JP | 2003274406 | 9/2003 |
| WO | 2009134575 A2 | 11/2009 |

OTHER PUBLICATIONS

Singh et al., "A 60 GHz Wireless Network for Enabling Uncompressed Video Communication", Consumer Communications and Networking, IEEE Communications Magazine, Dec. 1, 2008, http://opensiuc.lib.siu.edu/ece_articles/8, pp. 71-78.
Wu et al., "High-Performance Sub-Picture Compression Algorithm Used in High-Definition Video Discs", IEEE Transactions on Magnetics, vol. 43, No. 2, Feb. 1, 2007, pp. 776-779.

* cited by examiner

*Primary Examiner* — Anh Do
(74) *Attorney, Agent, or Firm* — Haverstock & Owens LLP

(57) ABSTRACT

Reordering of a bitstream is able to be used to speed up the decoding in embedded graphics coding. In the reordering, the signaling bits of all of the groups are sent and then the refinement bits of each group follow. With this reordering, the decoder can decode the header, identify the number of refinement bits for each group and locate the starting point of each group within the bitstream, therefore parallel processing of each group is able to be implemented at the decoder side.

23 Claims, 6 Drawing Sheets

US 8,526,745 B2

EMBEDDED GRAPHICS CODING: REORDERED BITSTREAM FOR PARALLEL DECODING

CROSS-REFERENCE TO RELATED APPLICATION(S)

This application claims priority under 35 U.S.C. §119(e) of the U.S. Provisional Patent Application Ser. No. 61/266,400, filed Dec. 3, 2009 and entitled, "WiHD: Grouping the Split Bits." The Provisional Patent Application Ser. No. 61/266, 400, filed Dec. 3, 2009 and entitled, "WiHD: Grouping the Split Bits" is also hereby incorporated by reference in its entirety for all purposes.

FIELD OF THE INVENTION

The present invention relates to the field of image processing. More specifically, the present invention relates to grouping signaling bits when encoding and decoding images/videos.

BACKGROUND OF THE INVENTION

Most image compression schemes are designed for "natural images" such as photos taken by a digital camera. For natural images, strong correlation exists among neighboring pixels. Hence, most image compression schemes work as follows:

1. The pixels are decorrelated using prediction or transform or both, resulting in a sparse histogram of the prediction residuals or transform coefficients. The histogram has a single peak which is located around 0.
2. Quantization is applied as necessary.
3. The (quantized) prediction residuals or transform coefficients are entropy coded. The entropy coder is designed for distributions described above. If the distribution has a significantly different shape, the coding performance is able to be poor.

However, there are many "unnatural images" such as images of graphics or text which typically have a large dynamic range, strong contrast, sharp edges, strong textures and sparse histograms. These types of images are usually not handled well by conventional image compression algorithms. Inter-pixel correlation is weaker, and prediction or transform does not provide a sparse distribution as it does for natural images.

Some schemes have been proposed for unnatural images. One example is referred to as "histogram packing" where the encoder goes through the whole image, computes the histogram and does a non-linear mapping of the pixels before compressing the image. The compression requires a two-pass processing, causing increased memory cost and more computations. The bitstream is not scalable which means that the decoder needs the whole bitstream to decode the image. Partial reconstruction is not possible without re-encoding.

In some versions of Embedded Graphics Coding (EGC), bit-plane coding is executed where for each existing group: if the current groups is not too small and there are not too many groups existing, the split bit for the group is sent, followed by 1 bit or multiple bits to refine the pixel values in the group; otherwise, raw bits are sent for refinement. Therefore, the groups are processed one by one.

SUMMARY OF THE INVENTION

In embedded graphics coding (EGC), when decoding a bit-plane, all the existing groups are processed. Since there is no prediction dependency between the groups, multiple groups can be processed in parallel to speed up the decoding. However, due to the variable length coding nature of EGC, the decoder does not know the starting point of each group within a bitstream. Therefore, the decoding of the next group cannot start until the previous groups are decoded. Reordering of a bitstream is able to be used to enable parallel graphics decoding such as in EGC. In the reordering, the "split_group" signaling bits of all of the groups of a bit-plane are sent and then the refinement bits of each group follow. With this reordering, by reading the split bit of each group, the decoder is able to derive a number of refinement bits for each group (e.g. when the "split_group" signaling bit equals zero, there will be only one refinement bit for the group, otherwise the number of refinement bits equals the number of group members), therefore the starting point of each group is also known, and parallel processing of each group is able to be implemented. To avoid potential issues when decoding, in some embodiments, a maximum number of allowed groups is set so the limit is never met. In this case, there could be some groups that should have been split but have not because the number of groups has reached the limit. For such groups the number of refinement bits cannot be derived by simply checking the value of "split_group" bit. To resolve this issue, instead of sending a "split_group" bit for each group, another signaling bit called "each_member" is sent. Each_member has an explicit relationship with the number of refinement bits for a group (i.e., when each_member=0, there is only 1 refinement bit, otherwise the number of refinement bits equals the number of group members), no matter the group is going to be split or not. The "split or not" decision is made by using the each_member signaling and other conditions (e.g. if the maximum group number has been reached). In some embodiments, it is checked whether the number of groups reaches the pre-defined limit before coding the bit-plane. If so, each member signaling is not sent and members of all of the groups are refined using raw bits.

In one aspect, a method of encoding programmed in a controller in a device comprises generating signaling bits for groups in a bit-plane of an image block, generating refinement bits for each of the groups and combining the signaling bits to form a header of a bitstream. The method further comprises dividing the image into blocks and partitioning the blocks into the groups. A signaling bit is set to 1 when a group of the groups contains any disparate pixels. The signaling bits are transmitted before the refinement bits. The refinement bits each of the groups is decoded utilizing parallel processing. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

In another aspect, a method of decoding programmed in a controller in a device comprises receiving an encoded bit-plane including signaling bits and refinement bits, determining a quantity of the refinement bits for each group within the bit-plane and utilizing the number of the refinement bits to perform parallel decoding of the bit-plane. A maximum number of allowable groups is set to a total number of groups. Header bits are utilized for determining the quantity of the refinement bits for each group. The method further comprises determining if a number of groups reaches a limit of the groups before decoding the bit-plane, wherein if the number of groups reaches the limit of the groups, then all of the groups are indicated as having raw refinement bits and the signaling bit is not sent. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

In another aspect, an encoder device comprises a memory for storing an application, the application for generating signaling bits for groups within a bit-plane, generating refinement bits for each of the groups and combining the signaling bits to form a header of a bit-plane and a processing component coupled to the memory, the processing component configured for processing the application. The signaling bits set to 1 when a group of the groups contains any disparate pixels. The application is further for transmitting the signaling bits before the refinement bits. Each of the groups is encoded and decoded utilizing parallel processing.

In another aspect, a decoder device comprises a memory for storing an application, the application for receiving an encoded bit-plane including signaling bits and refinement bits, determining the quantity of refinement bits for each group within the bit-plane and utilizing the quantity of the refinement bits for each group to decode the groups within the bit-plane in parallel and a processing component coupled to the memory, the processing component configured for processing the application. A maximum number of allowable groups is set to a total number of groups. Header bits are utilized for determining the quantity of the refinement bits for each group. The application is further for determining if a number of groups reaches a limit of the groups in decoding each group, wherein if the number of groups reaches the limit of the groups, then all of the groups are indicated as having raw refinement bits and the signaling bit is not sent. The application is further for determining if a number of groups reaches a limit of the groups in decoding each group, wherein if the number of groups does not reach the limit of the groups, and the signaling bit equals one, the group is split into two; if the number of groups does reach the limit of the groups, no group is further split.

In another aspect, a system programmed in a controller in a device comprises a partitioning module for partitioning a block of an image into a plurality of groups, an encoding module for encoding the groups including generating a signaling bit and a set of refinement bits for each group, wherein a set of signaling bits is transmitted before the refinement bits and a transmitting module for transmitting the encoded bitstream. The signaling bit is 1 when a group of the groups contains any disparate pixels. Each of the groups is encoded and decoded utilizing parallel processing. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

DETAILED DESCRIPTION OF THE PREFERRED EMBODIMENT

To transmit high definition video content over a wireless channel, Embedded Graphics Coding (EGC) or a variant of EGC compresses the high definition video content to improve bandwidth efficiency.

In EGC, a video frame is divided into multiple blocks, and the pixels of each block having the same value are grouped together. Beginning from the Most Significant Bit (MSB) and moving towards the Least Significant Bit (LSB), the encoder processes all of the groups in a bit-plane.

In order to speed up the decoding for EGC, reordering of a bitstream is utilized. In the reordering, signaling bits of all of the groups are sent first and then the refinement bits of each group follow. Parallel processing of each group is possible with this reordering. For decoding, knowledge of the position of the refinement bits is important. In original EGC, since a group sometimes does not have a "split_group" bit if the group is too small, or the number of groups reaches a pre-defined limit, in some embodiments, the maximum number of allowed groups is set so the limit is never met. To resolve this issue, the "split_group" bit for each group is replaced with an "each_member" signaling. Each_member has an explicit relationship with the number of refinement bits for a group (e.g. when each_member=0, there is only 1 refinement bit, otherwise the number of refinement bits equals the number of group members), no matter whether the group is going to be split or not. The "split or not" decision is made by using the each_member signaling and other conditions (e.g. if the maximum group number has been reached). In some embodiments, it is checked whether the number of groups reach the pre-defined limit before coding the bit-plane. If so, each member signaling is not sent and members of all of the groups are refined using raw bits.

Figure 1:
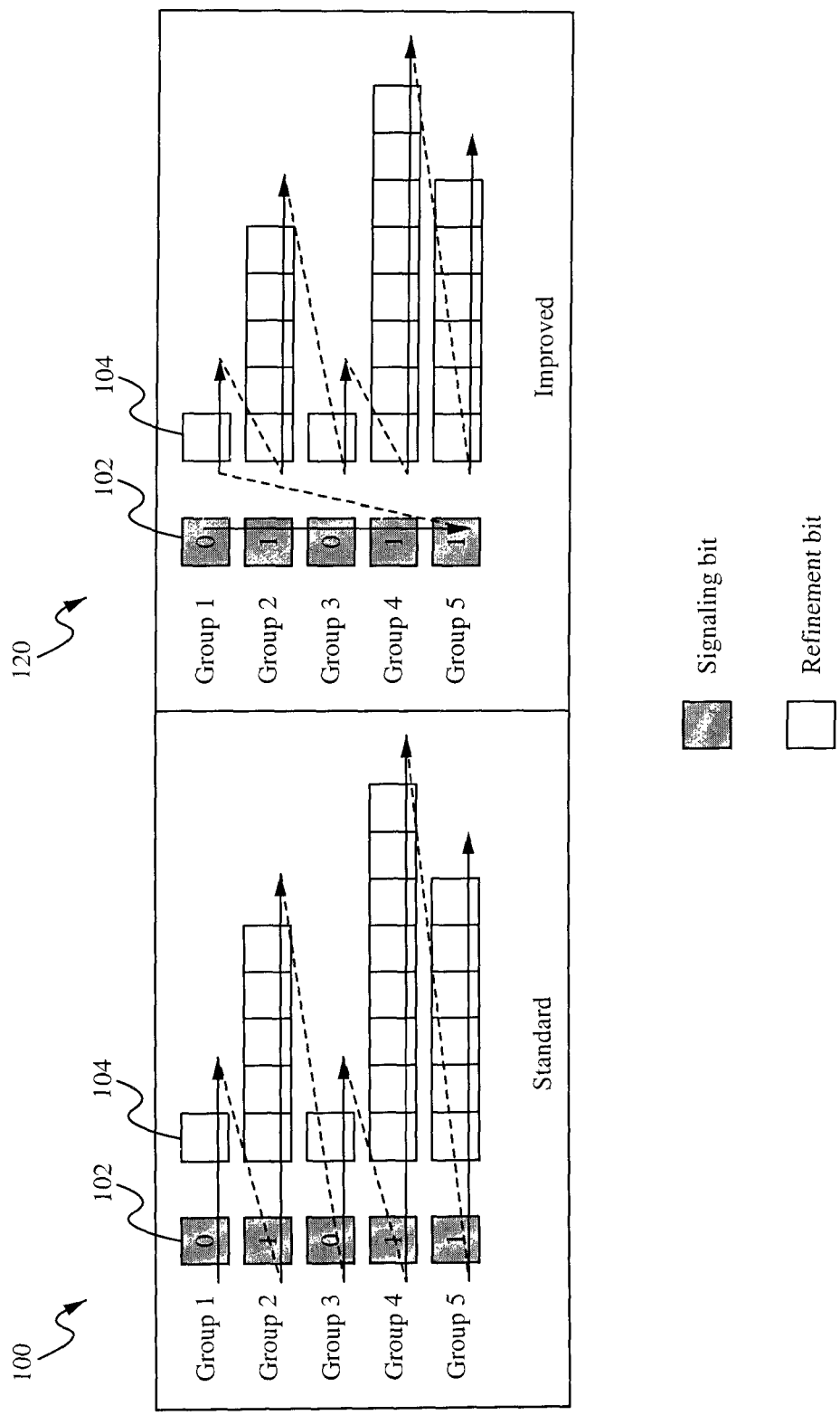
FIG. 1 illustrates a diagram of standard bitstream ordering and improved bitstream ordering according to some embodiments.

FIG. 1 illustrates a diagram of standard bitstream ordering 100 and improved bitstream ordering 120 according to some embodiments. In the standard bitstream ordering 100, each group, including a signaling bit 102 and refinement bit(s) 104, is encoded in an order where the signaling bit 102 is encoded and then the refinement bits 104 of that group are encoded. After encoding the last refinement bit of the group, the sequence then goes to the signaling bit of the next group. In the improved bitstream ordering 120, the signaling bits 102 are combined as the header of the bitstream. The order of the encoding includes the signaling bits 102 first and then the refinement bits 104, going from group to group for the refinement bits.

Figure 2:
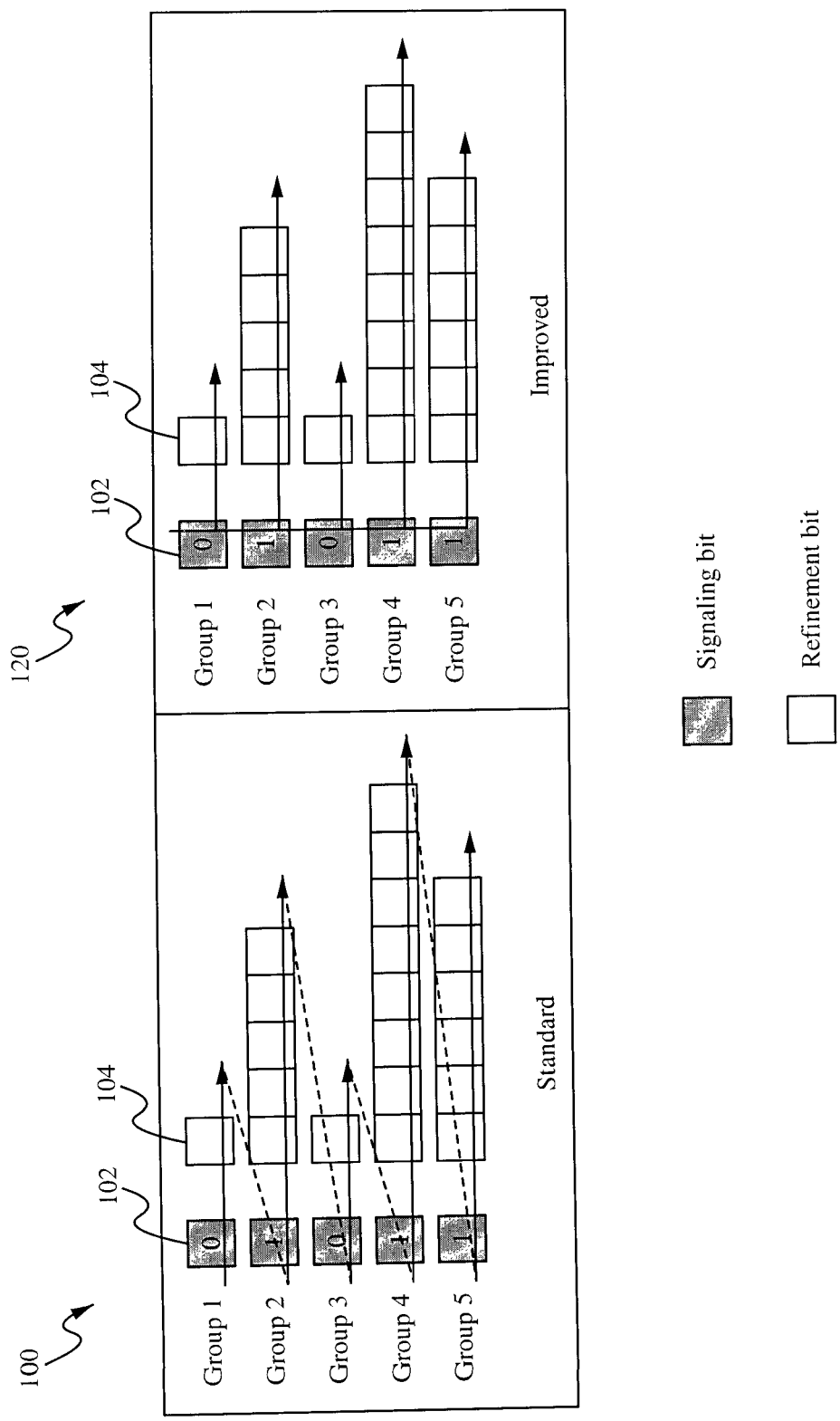
FIG. 2 illustrates a diagram of decoding standard-ordered bitstream and improved-ordered bitstream according to some embodiments.

FIG. 2 illustrates a diagram of decoding standard-ordered bitstream 100 and improved-ordered bitstream 120 according to some embodiments. The improved bitstream ordering 100 enables parallel processing. However, to decode the refinement bits 104 of the first group, for example, the "header" length should be known. Therefore, the number of signaling bits 102 should also be known.

Figure 3:
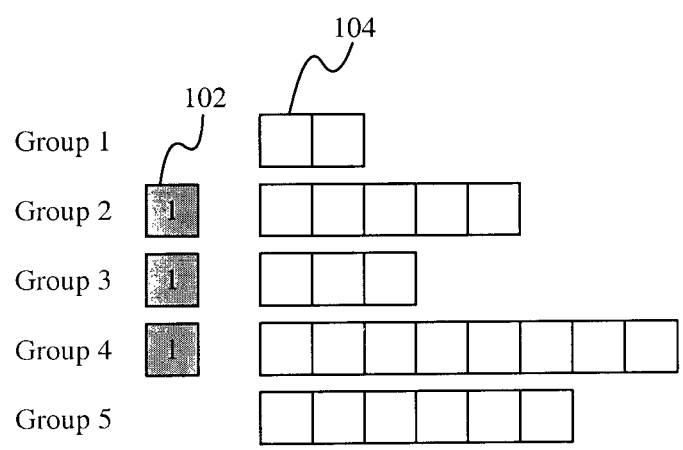
FIG. 3 illustrates a diagram of groups, signaling bits and refinement bits using standard bitstream ordering according to some embodiments.

However, sometimes a group does not have a signaling bit 102. For example, when the group is too small to split, it does not have a signaling bit 102. However, a decoder knows which groups are small. Also, when there are too many groups, some groups may not have a signaling bit 102. For example, in FIG. 3, before encoding the current bit-plane, there are 5 groups. Groups 2, 3 and 4 are split, which results in 8 groups in total. If the maximum number of allowed groups is 8, then Group 5 cannot be split, which would mean there is no signaling bit for Group 5. The decoder does not know that Group 5 is not split, unless the decoder counts the 1's in the signaling bits.

Figure 4:
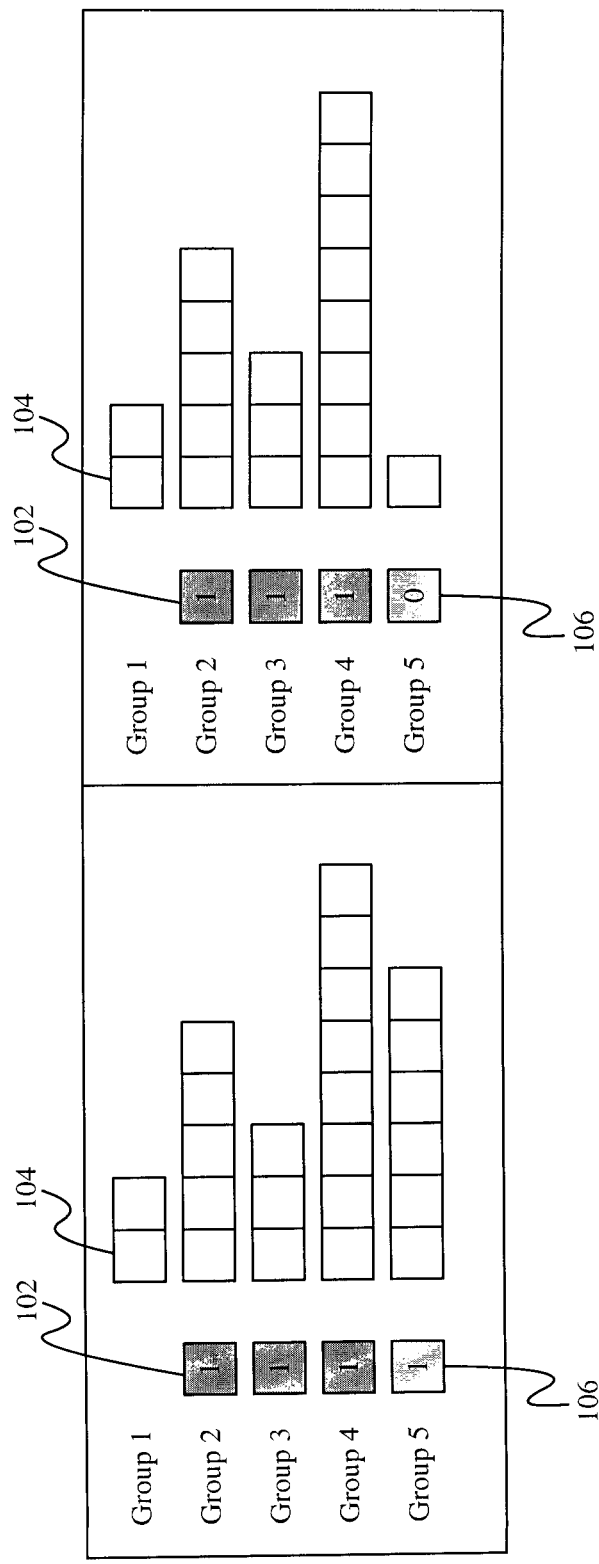
FIG. 4 illustrates diagrams of groups, signaling bits, refinement bits and a leading bit using improved bitstream ordering according to some embodiments.

One solution is to let the maximum group number be equal to the maximum possible number of groups (e.g. 64 for an 8×8 block) so that the condition of too many groups never becomes true. Another solution is shown in FIG. 4. In some embodiments, a leading bit 106 (or signaling bit) is sent for Group 5. The leading bit 106 has a different meaning than a "split bit." However, the offset of the refinement bits is able to be known beforehand using the leading bit 106.

When a group is being decoded, the decoder uses two binary variables to correctly process the group: split_group (true means the group is split into two) and each_member (true means each member in the groups has a refinement bit). There is a strong correlation between the two variables; therefore, the encoder only sends one of them and the decoder derives the other. In some implementations, split_group is sent, and then each_member is derived from split_group. However, in some embodiments, each_member is sent, and then split_group is derived from each_member.

Table I and Table II illustrate a comparison between a standard implementation and an improved implementation.

TABLE I

Standard implementation.

| Standard | split_group | each_member |
|---|---|---|
| Normal Groups | 0 | 0 |
|  | 1 | 1 |
| Small Groups | 0 | 1 |
| Other Groups | 0 | 1 |

TABLE II

Improved Implementation.

| Improved | each_member | split_group |
|---|---|---|
| Normal Groups | 0 | 0 |
|  | 1 | 1 |
| Small Groups | 1 | 0 |
| Other Groups | 0 | 0 |
|  | 1 | 0 |

From the tables, each_member is sent for any group. There is some redundancy if a group has each_member==1, and split_group==0. This means the group should have been split, but it was not because there are already too many groups. In such a case, sending each_member for the group at later bit-planes is not meaningful. One solution is that before decoding a bit-plane, the number of existing groups is checked. If there have already been too many groups, then each_member=1 for all groups.

Figure 5:
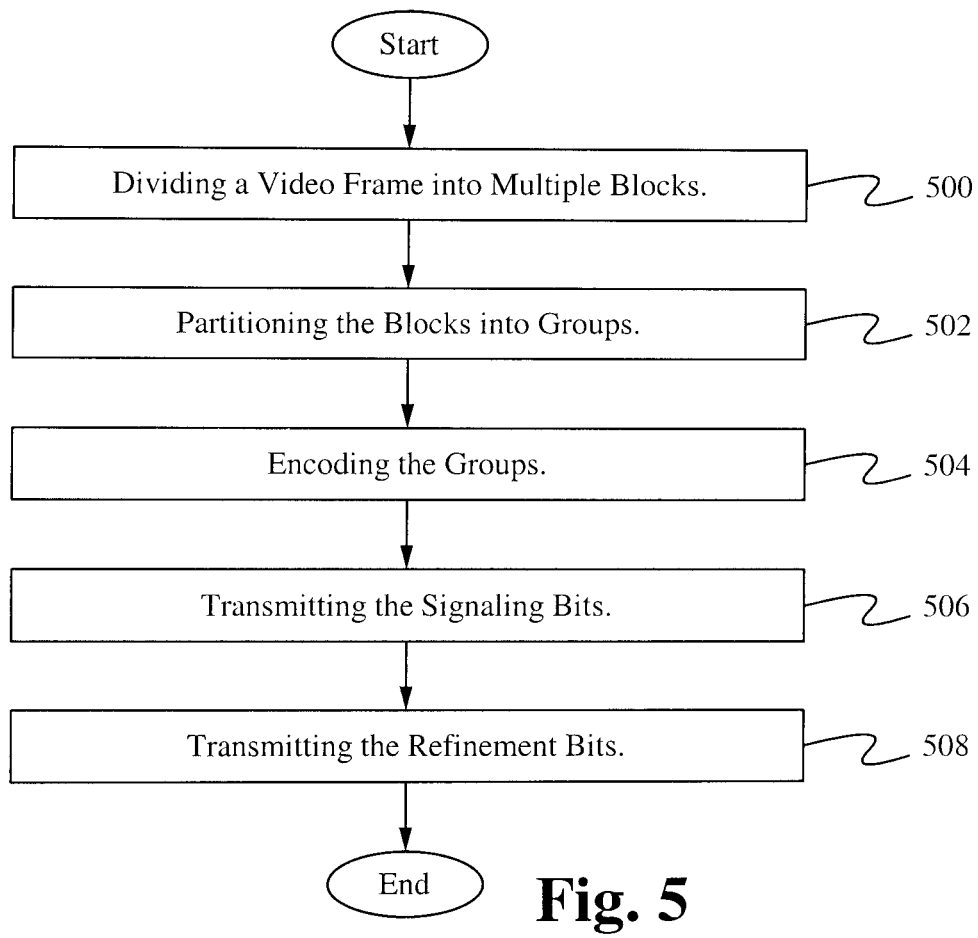
FIG. 5 illustrates a flowchart of a method of encoding according to some embodiments.

FIG. 5 illustrates a flowchart of a method of encoding according to some embodiments. In the step 500, a video frame is divided into multiple blocks. In the step 502, the pixels in each block of the blocks is partitioned into groups, where the groups are processed bit-plane by bit-plane from the most significant bit-plane (MSB) to the least significant bit-plane (LSB). A group is able to be split into two, if pixels in the group have different bit values in the bit-plane being encoded. In the step 504, each group is encoded. Encoding includes determining if the refinement bits are all the same, and a signaling bit and refinement bits are generated for each group. The signaling bit indicates whether the group includes more than one value. The refinement bits are the raw bits of the group in the current bit-plane. Before encoding the MSB, the pixels are assumed to be in the same group. Then, from the MSB to the LSB, the groups in the current bit plane are processed, where for each group: the encoder generates a signaling bit of "0" if all group members have the same bit value in the current bit-plane (and then sends a "0" or a "1" to indicate the bit value) or the encoder generates a signaling bit of "1" to indicate the disparate bits. Following the "1", the encoder generates the refinement bit for each pixel in the group and the encoder splits the original group into two. Encoding also includes grouping the signaling bits as the header of the bitstream. To transmit the encoded bit-plane, in the step 506, the signaling bits are transmitted. In the step 508, the refinement bits are transmitted following the signaling bits. Fewer or additional steps are able to be included. Further, the order of the steps is able to be changed where possible.

Figure 6:
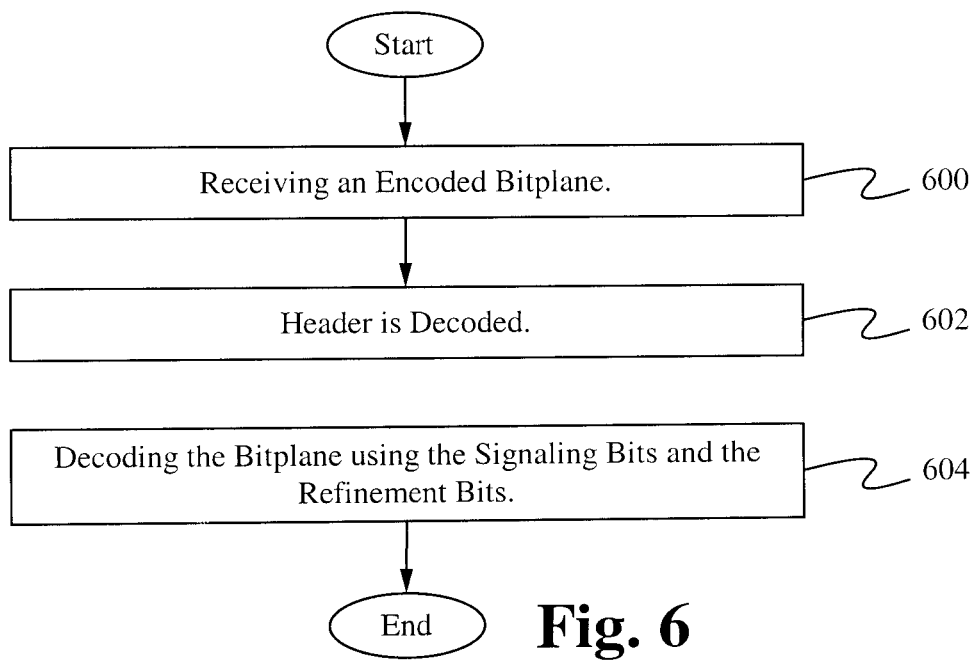
FIG. 6 illustrates a flowchart of a method of decoding according to some embodiments.

FIG. 6 illustrates a flowchart of a method of decoding according to some embodiments. In the step 600, an encoded bitstream of a certain bit-plane is received. The bitstream includes a header and refinement bits. In the step 602, the header is decoded. The header contains one signaling bit for each group that indicates whether a group contains one or multiple refinement bits, except for the groups that are too small. The decoder is able to know which groups are too small to be split. In some embodiments, the maximum groups is set so that the limit will not be exceeded. If the limit has been reached, groups that have disparate refinement bits are not split. However, signaling bits for those groups are still sent in the header. Hence the length of the header can be determined in advance by the decoder. By decoding the header, the length of each group can also be known by the decoder. Therefore the decoder is able to locate the starting point for each group within the bitstream, and parallel decoding is possible to be implemented. In some embodiments, instead of utilizing leading bits, it is determined if the number of groups reaches a limit. For example, before decoding a bit-plane, the number of existing groups is compared to the maximum allowable number of groups. If the number of groups has reached the limit, then all of the groups are indicated as having raw refinement bits. In the step 604, the bitstream is decoded by utilizing the signaling bits and the refinement bits. Fewer or additional steps are able to be included. Further, the order of the steps is able to be changed where possible.

Figure 7:
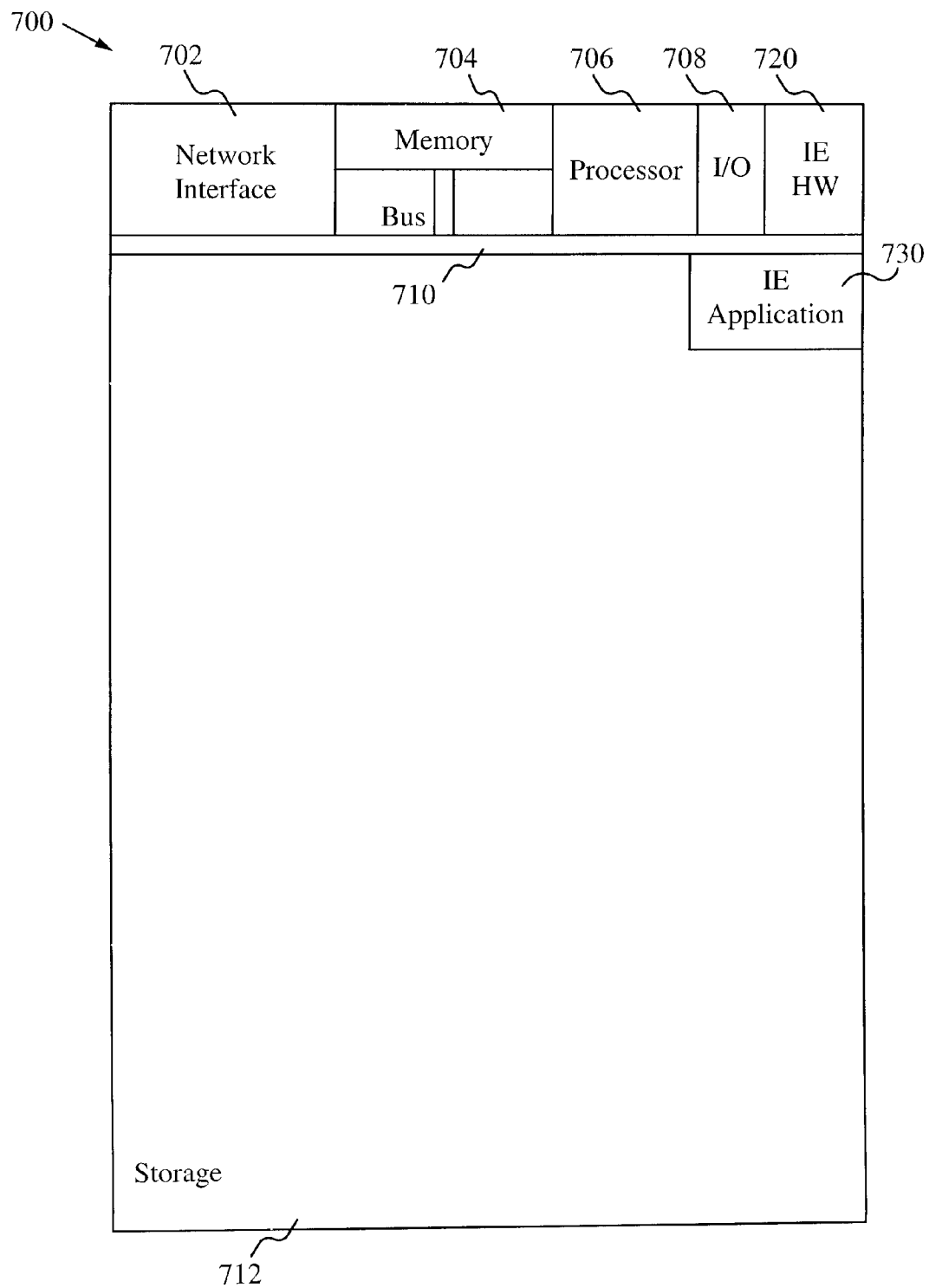
FIG. 7 illustrates a block diagram of an exemplary computing device configured to implement the improved encoding method according to some embodiments.

FIG. 7 illustrates a block diagram of an exemplary computing device 700 configured to implement the improved encoding method according to some embodiments. The computing device 700 is able to be used to acquire, store, compute, process, communicate and/or display information such as images and videos. For example, a computing device 700 is able to acquire and store a video. The improved encoding method is able to be used during or after acquiring the video, or when transferring the video from the device 700 to another device. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, display, printer, modem, touchscreen, button interface and other devices. In some embodiments, the hardware structure includes multiple processors and other hardware to perform parallel processing. Improved encoding application(s) 730 used to perform the improved encoding method are likely to be stored in the storage device 712 and memory 704 and processed as applications are typically processed. More or less components shown in FIG. 7 are able to be included in the computing device 700. In some embodiments, improved encoding hardware 720 is included. Although the computing device 700 in FIG. 7 includes applications 730 and hardware 720 for improved encoding, the improved encoding method is able to be implemented on a computing device in hardware, firmware, software or any combination thereof. For example, in some embodiments, the improved encoding applications 730 are programmed in a memory and executed using a processor. In another example, in some embodiments, the improved encoding hardware 720 is programmed hardware logic including gates specifically designed to implement the encoding method.

In some embodiments, the improved encoding application(s) 730 include several applications and/or modules. Modules such as a partitioning module, an encoding module, a signaling bit combining module, a transmitting module and a decoding module are able to perform the functions described herein. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television, a home entertainment system or any other suitable computing device.

To utilize the improved encoding method, a user acquires a video/image such as on a digital camcorder, and while or after the video is acquired, or when sending the video to another device such as a computer, the improved encoding method automatically encodes each image of the video, so that the video is encoded appropriately to maintain a high quality video. The improved encoding method occurs automatically without user involvement. The video is also able to be decoded to be displayed using a similar method.

In operation, improved encoding is used to encode and transmit images such as frames of a video. Each image block is processed from the MSB to the LSB, hence the resulting bit-plane is still embedded. The improved encoding groups signaling bits and sends the signaling bits before sending the refinement bits. Such an implementation enables parallel processing to be implemented. The improved encoding method is able to be used in any implementation including, but not limited to, wireless high definition (WiHD).

The improved graphics-mode compression method described herein is able to be used with videos and/or images.

High definition video is able to be in any format including but not limited to HDCAM, HDCAM-SR, DVCPRO HD, D5 HD, XDCAM HD, HDV and AVCHD.

Some Embodiments of Embedded Graphics Coding: Reordered Bitstream for Parallel Decoding 1. A method of encoding programmed in a controller in a device comprising:
    a. generating signaling bits for groups of a bit-plane of an image block;
    b. generating refinement bits for each of the groups; and
    c. combining the signaling bits to form a header of a bitstream.
2. The method of clause 1 further comprising dividing the image into blocks and partitioning the blocks into the groups.
3. The method of clause 1 wherein a signaling bit is set to 1 when a group of the groups contains any disparate pixels.
4. The method of clause 1 wherein the signaling bits are transmitted before the refinement bits.
5. The method of clause 4 wherein the refinement bits each of the groups is decoded utilizing parallel processing.
6. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.
7. A method of decoding programmed in a controller in a device comprising:
    a. receiving an encoded bit-plane including signaling bits and refinement bits;
    b. determining a quantity of the refinement bits for each group within the bit-plane; and
    c. utilizing the number of the refinement bits to perform parallel decoding of the bit-plane.
8. The method of clause 7 wherein a maximum number of allowable groups is set to a total number of groups.
9. The method of clause 7 wherein header bits are utilized for determining the quantity of the refinement bits for each group.
10. The method of clause 7 further comprising determining if a number of groups reaches a limit of the groups before decoding the bit-plane, wherein if the number of groups reaches the limit of the groups, then all of the groups are indicated as having raw refinement bits and the signaling bit is not sent.
11. The method of clause 7 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.
12. An encoder device comprising:
    a. a memory for storing an application, the application for:
        i. generating signaling bits for groups within a bit-plane;
        ii. generating refinement bits for each of the groups; and
        iii. combining the signaling bits to form a header of a bit-plane; and b. a processing component coupled to the memory, the processing component configured for processing the application.

13. The encoder device of clause 12 wherein the signaling bits are set to 1 when a group of the groups contains any disparate pixels.

14. The encoder device of clause 12 wherein the application is further for transmitting the signaling bits before the refinement bits.

15. The encoder device of clause 12 wherein each of the groups is encoded and decoded utilizing parallel processing.

16. A decoder device comprising:
   a. a memory for storing an application, the application for:
      i. receiving an encoded bit-plane including signaling bits and refinement bits;
      ii. determining a quantity of refinement bits for each group within the bit-plane; and
      iii. utilizing the quantity of the refinement bits for each group to decode the groups within the bit-plane in parallel; and
   b. a processing component coupled to the memory, the processing component configured for processing the application.

17. The decoder device of clause 16 wherein a maximum number of allowable groups is set to a total number of groups.

18. The decoder device of clause 16 wherein header bits are utilized for determining the quantity of the refinement bits for each group.

19. The decoder device of clause 16 the application is further for determining if a number of groups reaches a limit of the groups before decoding the bit-plane, wherein if the number of groups reaches the limit of the groups, then all of the groups are indicated as having raw refinement bits and the signaling bit is not sent.

20. The decoder device of clause 16 the application is further for determining if a number of groups reaches a limit of the groups, wherein if the number of groups does not reach the limit of the groups, and the signaling bit equals one, the group is split into two; if the number of groups does reach the limit of the groups, no group is further split.

21. A system programmed in a controller in a device comprising:
   a. a partitioning module for partitioning a block of an image into a plurality of groups;
   b. an encoding module for encoding the groups including generating a signaling bit and a set of refinement bits for each group, wherein a set of signaling bits is transmitted before the refinement bits; and
   c. a transmitting module for transmitting the encoded bitstream.

22. The system of clause 21 wherein the signaling bit is 1 when a group of the groups contains any disparate pixels.

23. The system of clause 21 wherein each of the groups is encoded and decoded utilizing parallel processing.

24. The system of clause 21 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a controller in a device comprising:
   a. dividing an image into blocks and partitioning the blocks into groups; and
   b. encoding each of the groups, wherein encoding further comprises:
      i. generating signaling bits for groups of a bit-plane of an image block;
      ii. generating refinement bits for each of the groups; and
      iii. combining the signaling bits to form a header of a bitstream.

2. The method of claim 1 wherein a signaling bit is set to 1 when a group of the groups contains any disparate pixels.

3. The method of claim 1 wherein the signaling bits are transmitted before the refinement bits.

4. The method of claim 3 wherein the refinement bits each of the groups is decoded utilizing parallel processing.

5. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

6. A method of decoding programmed in a controller in a device comprising:
   a. receiving an encoded bit-plane including signaling bits and refinement bits;
   b. determining a quantity of the refinement bits for each group within the bit-plane; and
   c. utilizing the number of the refinement bits to perform parallel decoding of the bit-plane.

7. The method of claim 6 wherein a maximum number of allowable groups is set to a total number of groups.

8. The method of claim 6 wherein header bits are utilized for determining the quantity of the refinement bits for each group.

9. The method of claim 6 further comprising determining if a number of groups reaches a limit of the groups before decoding the bit-plane, wherein if the number of groups reaches the limit of the groups, then all of the groups are indicated as having raw refinement bits and the signaling bit is not sent.

10. The method of claim 6 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

11. An encoder device comprising:
   a. a memory for storing an application, the application for:
      i. dividing an image into blocks and partitioning the blocks into groups; and ii. encoding each of the groups, wherein encoding further comprises:
(1) generating signaling bits for groups within a bit-plane;
(2) generating refinement bits for each of the groups; and
(3) combining the signaling bits to form a header of a bit-plane; and
b. a processing component coupled to the memory, the processing component configured for processing the application.

12. The encoder device of claim 11 wherein the signaling bits are set to 1 when a group of the groups contains any disparate pixels.

13. The encoder device of claim 11 wherein the application is further for transmitting the signaling bits before the refinement bits.

14. The encoder device of claim 11 wherein each of the groups is encoded and decoded utilizing parallel processing.

15. A decoder device comprising:
a. a memory for storing an application, the application for:
i. receiving an encoded bit-plane including signaling bits and refinement bits;
ii. determining a quantity of refinement bits for each group within the bit-plane ; and
iii. utilizing the quantity of the refinement bits for each group to decode the groups within the bit-plane in parallel; and
b. a processing component coupled to the memory, the processing component configured for processing the application.

16. The decoder device of claim 15 wherein a maximum number of allowable groups is set to a total number of groups.

17. The decoder device of claim 15 wherein header bits are utilized for determining the quantity of the refinement bits for each group.

18. The decoder device of claim 15 the application is further for determining if a number of groups reaches a limit of the groups before decoding the bit-plane, wherein if the number of groups reaches the limit of the groups, then all of the groups are indicated as having raw refinement bits and the signaling bit is not sent.

19. The decoder device of claim 15 the application is further for determining if a number of groups reaches a limit of the groups, wherein if the number of groups does not reach the limit of the groups, and the signaling bit equals one, the group is split into two;
if the number of groups does reach the limit of the groups, no group is further split.

20. A system programmed in a controller in a device comprising:
a. a partitioning module for partitioning a block of an image into a plurality of groups;
b. an encoding module for encoding the groups including generating a signaling bit and a set of refinement bits for each group, wherein a set of signaling bits is transmitted before the refinement bits; and
c. a transmitting module for transmitting the encoded bitstream.

21. The system of claim 20 wherein the signaling bit is 1 when a group of the groups contains any disparate pixels.

22. The system of claim 20 wherein each of the groups is encoded and decoded utilizing parallel processing.

23. The system of claim 20 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

* * * * *